Patented Mar. 1, 1938

2,109,968

UNITED STATES PATENT OFFICE 2,109,968

PRODUCTS AND PROCESSES FOR PRODUCING SAME

Arnold M. Collins, Wilmington, Del., assignor to E. I. du Pont de Nemours & Company, Wilmington, Del., a corporation of Delaware No Drawing. Application November 2, 1931, Serial No. 572,726

1 Claim. (Cl. 204—1)

This invention relates to processes for treating synthetic latices and the products produced by such processes. More particularly the invention relates to the electrodeposition of halogen-2-butadiene-1,3 polymers from dispersions of the same.

PRIOR ART

It has been discovered, as disclosed by Carothers and Collins in application #490,538, filed October 22, 1930, that hydrogen halides such as hydrogen chloride and hydrogen bromide may be made to combine with monovinylacetylene under suitable conditions with the formation of chloro-2-butadiene-1,3 and bromo-2-butadiene-1,3 respectively. By way of illustration, they described the formation of chloro-2-butadiene-1,3 by passing monovinylacetylene into an aqueous solution containing hydrochloric acid, cuprous chloride, and ammonium chloride, the two last-named compounds acting in conjunction as a preferred catalyst for the reaction. They further showed, as described and claimed in application #519,243, filed February 28, 1931, that chloro-2-butadiene-1,3 may be polymerized under a variety of conditions, e. g., by the use of elevated temperature and/or elevated pressure, air, oxidizing catalysts, and light, to yield products closely resembling vulcanized natural rubber in their physical properties. It was further shown by Williams in application #519,244, filed February 28, 1931, that other polymers of chloro-2-butadiene-1,3 can be prepared by stopping the polymerization before it goes to completion, and while the polymers are still plastic, which polymers possess the properties of unvulcanized natural rubber, may be utilized and fabricated in the same way, and finally converted by heat into products closely resembling vulcanized natural rubber. It has been further shown by Collins in application #537,484, filed May 14, 1931, that chloro-2-butadiene-1,3 is readily emulsified in water and, after polymerization in this state, yields an artificial latex from which a material very similar to natural vulcanized rubber may be obtained by coagulation or evaporation. Finally it has been discovered by Carothers and Collins as disclosed and claimed in application #537,492, filed May 14, 1931 that bromo-2-butadiene-1,3 may be subjected to the processes of the above cited applications, yielding polymers very similar to those of chloro-2-butadiene-1,3 already described. While the rubber-like products obtained by complete polymerization either in emulsion or in mass or by heating the plastic polymers of the type discovered by Williams very closely resemble vulcanized natural rubber in most of their physical and mechanical properties, they are in certain respects markedly superior. For example, they are only very slightly swelled by aliphatic hydrocarbons such as gasoline, and are much more resistant than natural rubber to the action of ozone.

It has been proposed in numerous patents to prepare articles of natural rubber by coagulation or other means directly from natural rubber latex. In order for these articles to have the necessary strength, however, they must invariably be subjected to the step of vulcanization, which may be applied either to the uncoagulated latex or to the formed rubber article after coagulation. This step of vulcanization, in addition to making the process of manufacture of the rubber articles more lengthy and more expensive, also introduces sulfur or similar compounds which in general darken the product, produce an unpleasant odor and taste, and also cause tarnishing of certain metals such as copper and silver in contact with the rubber. In addition to these objections, freshly coagulated natural rubber is very weak and consequently thread, ribbons, and thin sheets prepared therefrom require special care in handling before vulcanization.

OBJECTS OF THE INVENTION

Objects of this invention are therefore to provide a method for the production of articles directly from artificial latices prepared from halogen-2-butadiene-1,3, e. g., chloro-2-butadiene-1,3 and bromo-2-butadiene-1,3 and to produce formed articles which have the desirable properties of natural vulcanized rubber, and are in addition light in color, free from objectionable taste and odor, have no tarnishing action, and furthermore are highly resistant to swelling by such substances as gasoline, and highly resistant to deterioration by agents such as ozone. A further object of the invention is to provide for the manufacture of formed elastic articles directly from artificial latices by processes which do not require vulcanization or the introduction of sulfur or sulfur compounds and in which the freshly coagulated rubber is not easily damaged. A specific object relates to the use of electrodeposition methods for the treatment of artificial latices of the character described. Other objects of the invention will be disclosed in the following description of the invention.

DESCRIPTION OF THE INVENTION

A dispersion of polymerized chloro- or bromo-2-butadiene-1,3, hereafter referred to as synthetic latex, is subjected to conditions which bring about the separation of the rubber-like polymer from the liquid phase of the dispersion in the form of elastic articles of the desired shape. This is accomplished in accordance with the teachings of the present invention by mixing a dispersion of a halogen-2-butadiene-1,3 polymer with a suitable electrolyte, and submitting the dispersed mixture in a vessel to an electromotive force of sufficient strength to generate a current which will cause the deposition on the anode of a strong, uniform coating of polymer which has been coagulated from the dispersion. When a deposit of suitable thickness is built up on the anode, the current is discontinued, the anode removed and the film or coating of polymer stripped from the anode. The anode is preformed to a shape conforming to that which it is desired that the coating of polymer will assume.

The following example illustrates one method of carrying out the invention:

Synthetic latex prepared according to Example A (below) is treated with 2.5 g. of ammonium chloride and 2 g. of sodium hydroxide dissolved in a volume of water equal to the volume of latex treated. This provides ammonium hydroxide, sodium chloride, and a slight excess of sodium hydroxide. After a thorough mixing the dispersion is submitted to electrolysis in a suitable container with a small zinc plate as cathode and a larger zinc surface as anode corresponding in size and shape to the rubber article which it is desired to make. An electro-motive force of such strength as to give a current density of approximately one milli-ampere per sq. cm. is applied. When the coagulated material upon the anode has reached the desired thickness, the deposit is removed from the bath and dried, preferably while still in contact with the anode. The anode is thus finally covered with a uniform deposit resembling natural vulcanized rubber. The shaped article is then removed from the anode by any suitable means.

Considerable variation is allowable in the conditions used, the above example being given by way of illustration only. Thus the latex may be used directly without treatment with sodium hydroxide and ammonium chloride but in this case much higher voltages are necessary in order to obtain the desired current. It is desirable to have the latex only slightly alkaline as in the above procedure. If a large excess of a strong base such as sodium hydroxide is used in the above procedure, the polymers are deposited much more slowly even though the same current is used. The sodium chloride present in the process used above assists in reducing the resistance of the solution electrolyzed and may be replaced by other ionizable and soluble salts. An excess of salt, however, tends to cause coagulation thruout the latex.

The rubber-like film prepared in the above example is uniform in texture, elastic, strong, light in color, resistant to the action of hydrocarbons and other common organic solvents, and in general possesses the properties of similar articles prepared from dispersions of chloro-2-butadiene-1,3 polymers by the methods described in the copending Collins application above referred to.

Although the above example describes the invention as applied to the treatment of a dispersion of chloro-2-butadiene-1,3 polymer, it may applied in a similar manner to the treatment of dispersions of bromo-2-butadiene-1,3 polymers.

A preferred synthetic latex suitable for use in the above example may be prepared as follows:

EXAMPLE A

Preparation of standard latex

Four hundred grams of water containing 8 g. of dissolved sodium oleate is rapidly stirred by means of a mechanical stirrer and 400 grams of chloro-2-butadiene-1,3 is then added slowly with constant stirring. A homogeneous emulsion results. This emulsion is then maintained at 10° C. for 48 hours or until the polymerization of the chloro-2-butadiene-1,3 is substantially complete. The resulting pure white, fine dispersion of polymerized chloro-2-butadiene-1,3 is treated with 16 g. of ordinary concentrated ammonium hydroxide solution and then with 4 g. of phenyl-beta-naphthylamine which is first dispersed in water by grinding in a ball mill with sodium oleate solution. The resulting compounded dispersion is strained thru a fine cloth to remove any large solid particles and is then ready for use.

Where it is desired to use a more concentrated latex than that of Example A, the procedure of Example B may be followed:

EXAMPLE B

Preparation of concentrated latex

The procedure of Example A is followed exactly except that 600 g. instead of 400 g. of chloro-2-butadiene-1,3 is added to 400 g. of 3% sodium oleate solution and 21 g. of ammonium hydroxide and 6 g. of phenyl-beta-naphthylamine are used.

Alternately a concentrated latex is made from the standard latex prepared above by removing water by distillation with constant stirring and preferably in a stream of nitrogen or other non-oxidizing gas until the desired concentration has been brought about.

By varying the concentration of the latex, the character of the anodic deposit will be varied to a certain extent. When the concentration of latex is varied from that used in the example given above, the electromotive force must be adjusted in order to generate a current which will effect a proper deposition of polymer. A suitable electro potential for any given latex can readily be determined by simple experiment in the light of the above disclosure.

In addition to the dispersion described above, a great variety of latices may be used satisfactorily in the practice of this invention. Thus any of the latices disclosed in Collins U. S. application #537,484, cited above, may in general be used. These latices include those prepared under high pressure and at temperatures above 10° C. and those in which alkalies, catlysts, inhibitors of polymerization, and solvents for the chloro-2-butadiene-1,3 are present during the polymerization. Under the classification of solvents are included volatile solvents such as benzene, softeners such as those used in the rubber and nitrocellulose arts, and substances which are themselves capable of polymerization such as isoprene, styrene, and vinyl acetate. Furthermore, as disclosed in the above cited application, other modifying agents such as proteins, pectins, and water-soluble resins may be added either before or after the polymerization of the chloro-2-butadiene-1,3. Dyes, pigments, and fillers of the type used in rubber compounding may similarly be dispersed with the chloro-2-butadiene-1,3 before its polymerization or may be added afterwards. The synthetic latex may also be mixed with natural rubber latex of similar aqueous dispersions. Unusually strong and tear-resistant articles may be obtained if salts of water-soluble glyptals, that is, synthetic resins formed by partial esterification of a polybasic acid with a polyhydric alcohol which may also be partly esterified by other acids, are used as dispersing agents instead of the sodium oleate specified in the above descriptions of the preparation of the synthetic latex. Unusually pliable products may be obtained if a small quantity, for instance 1-2%, of dichloro-2,3-butadiene-1,3 is added to the chloro-2-butadiene-1,3 before polymerization, as disclosed in the copending application of Carothers and Berchet, Serial No. 589,052, filed January 26, 1932. Stiffer products, which are desirable for some purposes are made from the standard latex described above. Still stiffer products are made by first incorporating proteins, especially glue, into the latex.

Any modification of or variation from the specific conditions described herein which conforms to the spirit of the invention is intended to be included within the scope of the claim.

I claim:

The process of forming a strong tear-resistant product resembling vulcanized natural rubber which comprises passing an electric current through a dispersion of chloro-2-butadiene-1,3 polymer containing an electrolyte and a salt of a water-soluble alkyd resin, said current being of sufficient density to effect the deposition of a coherent film of polymer on the anode.

ARNOLD M. COLLINS.